(12) United States Patent
Thornberg et al.

(10) Patent No.: US 11,442,446 B2
(45) Date of Patent: Sep. 13, 2022

(54) AUTOMATIC ENVELOPE LIMITING BASED ON DETECTED HYDRAULIC FAILURES

(71) Applicant: Sikorsky Aircraft Corporation, Stratford, CT (US)

(72) Inventors: Christopher A. Thornberg, Newtown, CT (US); Derek H. Geiger, Wilton, CT (US); Joseph T. Driscoll, Prospect, CT (US); Ole Wulff, Ansonia, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 15/696,345

(22) Filed: Sep. 6, 2017

(65) Prior Publication Data

US 2019/0072952 A1    Mar. 7, 2019

(51) Int. Cl.
| | |
|---|---|
| *G05D 1/00* | (2006.01) |
| *B64C 27/56* | (2006.01) |
| *B64C 27/64* | (2006.01) |
| *B64C 27/57* | (2006.01) |
| *G05D 1/08* | (2006.01) |
| *B64C 13/50* | (2006.01) |

(52) U.S. Cl.
CPC ......... *G05D 1/0055* (2013.01); *B64C 13/503* (2013.01); *B64C 27/56* (2013.01); *B64C 27/57* (2013.01); *B64C 27/64* (2013.01); *G05D 1/0858* (2013.01)

(58) Field of Classification Search
CPC ........ G05D 1/0055; B64C 27/56; B64C 27/64
See application file for complete search history.

(56) References Cited

U.S. PATENT DOCUMENTS

| | | | |
|---|---|---|---|
| 3,454,319 A | 9/1969 | Sherman et al. | |
| 4,904,999 A | 2/1990 | Klansnic et al. | |
| 5,819,188 A | 10/1998 | Vos | |
| 5,977,648 A | 11/1999 | Seffernick et al. | |
| 6,189,836 B1 | 2/2001 | Gold | |
| 6,354,393 B1 * | 3/2002 | Ahlert | B62D 5/06 |
| | | | 180/403 |
| 8,195,346 B1 * | 6/2012 | Duerksen | B64C 13/28 |
| | | | 701/15 |
| 9,272,780 B2 * | 3/2016 | Mercer | B64C 27/68 |
| 2004/0010354 A1 * | 1/2004 | Nicholas | B64C 13/503 |
| | | | 701/4 |
| 2009/0177292 A1 | 7/2009 | Mossman | |

(Continued)

OTHER PUBLICATIONS

Parameter estimation in a failure detection system of a fighter aircraft Published in: Proceedings of the IEEE 1993 National Aerospace and Electronics Conference-NAECON 1993 (pp. 462-467 vol. 1) Authors: McCartney, D.M. • Skormin, V.A. (Year: 1993).*

*Primary Examiner* — James M McPherson
*Assistant Examiner* — Bakari Underwood
(74) *Attorney, Agent, or Firm* — Michael Best & Friedrich LLP

(57) ABSTRACT

A rotary-wing aircraft and system for flying a rotary-wing aircraft. The aircraft includes a servo system for actuating a rotor of the aircraft. A hydraulic system provides hydraulic power to the servo system, and a sensor measures a parameter of the hydraulic system. A processor determines a condition of the hydraulic system from the parameter and enforces an effective flight envelop based on the condition of the hydraulic system in order to fly the aircraft within the effective flight envelope.

15 Claims, 3 Drawing Sheets

(56) References Cited

U.S. PATENT DOCUMENTS

| | | | |
|---|---|---|---|
| 2013/0168501 A1* | 7/2013 | Chaduc | B64C 27/64 |
| | | | 244/227 |
| 2013/0334361 A1 | 12/2013 | Fortenbaugh | |
| 2017/0233064 A1* | 8/2017 | McCormick | B64C 13/504 |
| | | | 244/99.5 |
| 2018/0002007 A1* | 1/2018 | Leguay | F04B 23/06 |

* cited by examiner

AUTOMATIC ENVELOPE LIMITING BASED ON DETECTED HYDRAULIC FAILURES

BACKGROUND OF THE INVENTION

The present invention is directed to operation of rotary-wing aircraft and, in particular, to a system for dynamically altering a flight envelope based on a condition of a hydraulic system that powers the aircraft.

Rotary-wing aircraft include servo motors that control the rotation of the rotor systems, in order to provide flight to the aircraft. The servo motors are powered by hydraulic pressure from hydraulic systems. Upon loss of hydraulic pressure to one or more stages of the servo motors or an impairment to the hydraulic system, the net load capability of the servos may be reduced, requiring that some flight maneuvers be limited. There is however no protection against a pilot commanding more servo capability that is available for an impaired aircraft, and the pilot often does not know the new limits of the impaired aircraft. Thus, there is a need to ensure that a pilot input that requests a maneuver beyond the capabilities of an impaired aircraft does not get implemented at the aircraft.

SUMMARY OF THE INVENTION

According to one embodiment of the present invention, a system for flying a rotary-wing aircraft includes: a hydraulic system for providing hydraulic power to a rotor system of the aircraft; a sensor that measures a parameter of the hydraulic system; and a processor. The processor is configured to determine a condition of the hydraulic system from the parameter, and fly the aircraft within an effective flight envelope that is based on the condition of the hydraulic system.

According to another embodiment of the present invention, a rotary-wing aircraft includes: a servo system for actuating a rotor of the rotary-wing aircraft; a hydraulic system for powering the servo system; a sensor that measures a parameter of the hydraulic system; and a processor. The processor is configured to determine a condition of the hydraulic system from the parameter, and enforce on the aircraft an effective flight envelope that is based on the condition of the hydraulic system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
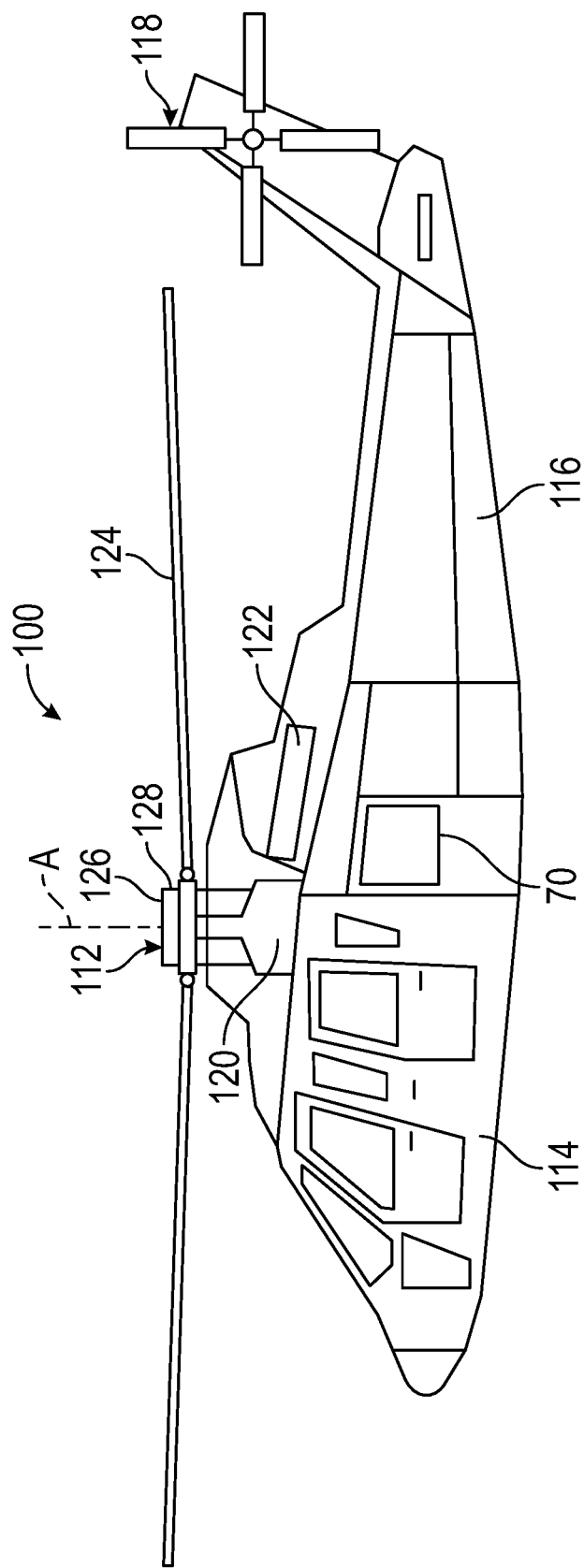
FIG. 1 schematically illustrates a conventional rotary wing aircraft having a main rotor assembly.

Referring now to the Figures, where the invention will be described with reference to specific embodiments, without limiting same, FIG. 1 schematically illustrates a conventional rotary wing aircraft 100 having a main rotor assembly 112. The aircraft 100 includes an airframe 114 having an extending tail 116 which mounts an anti-torque system, such as a tail rotor assembly 118. The main rotor assembly 112 is driven about an axis of rotation through a transmission (illustrated schematically at 120) by one or more engines 122. The main rotor assembly 112 includes a plurality of rotor blades 124 mounted to a rotor hub 126, and a swashplate 128 that is used to affect a state or orientation of the rotor blades 124. The rotor blades 124 can have a variable pitch that can be used to affect pitch and roll angles of the aircraft 100 as well as velocity of the aircraft 100. The pitch of the rotor blades 124 can be controlled by a collective control or by a cyclic control. In various embodiment, the main rotor assembly 112 and the tail rotor assembly 118 are powered by respective servo motors, which in turn are powered by hydraulic systems onboard the aircraft 100. The aircraft 100 is a fly-by-wire aircraft that implements control laws for flying the aircraft in response to a pilot input.

Aircraft 100 includes a flight control system 70 for controlling flight of the aircraft 100. In particular, the flight control system 70 includes a processor (not shown) that executes a program that determines an effective flight envelope based on a condition of the hydraulic system of the aircraft and enforces the effective flight envelope against pilot inputs and sensor feedbacks. When a pilot provides a command for flying the aircraft outside of the effective flight envelope, the flight control system 70 implements a set of control laws that maintain the aircraft within the effective flight envelope. A detailed discussion of the flight control system 70 is provided below with respect to FIG. 2.

Figure 2:
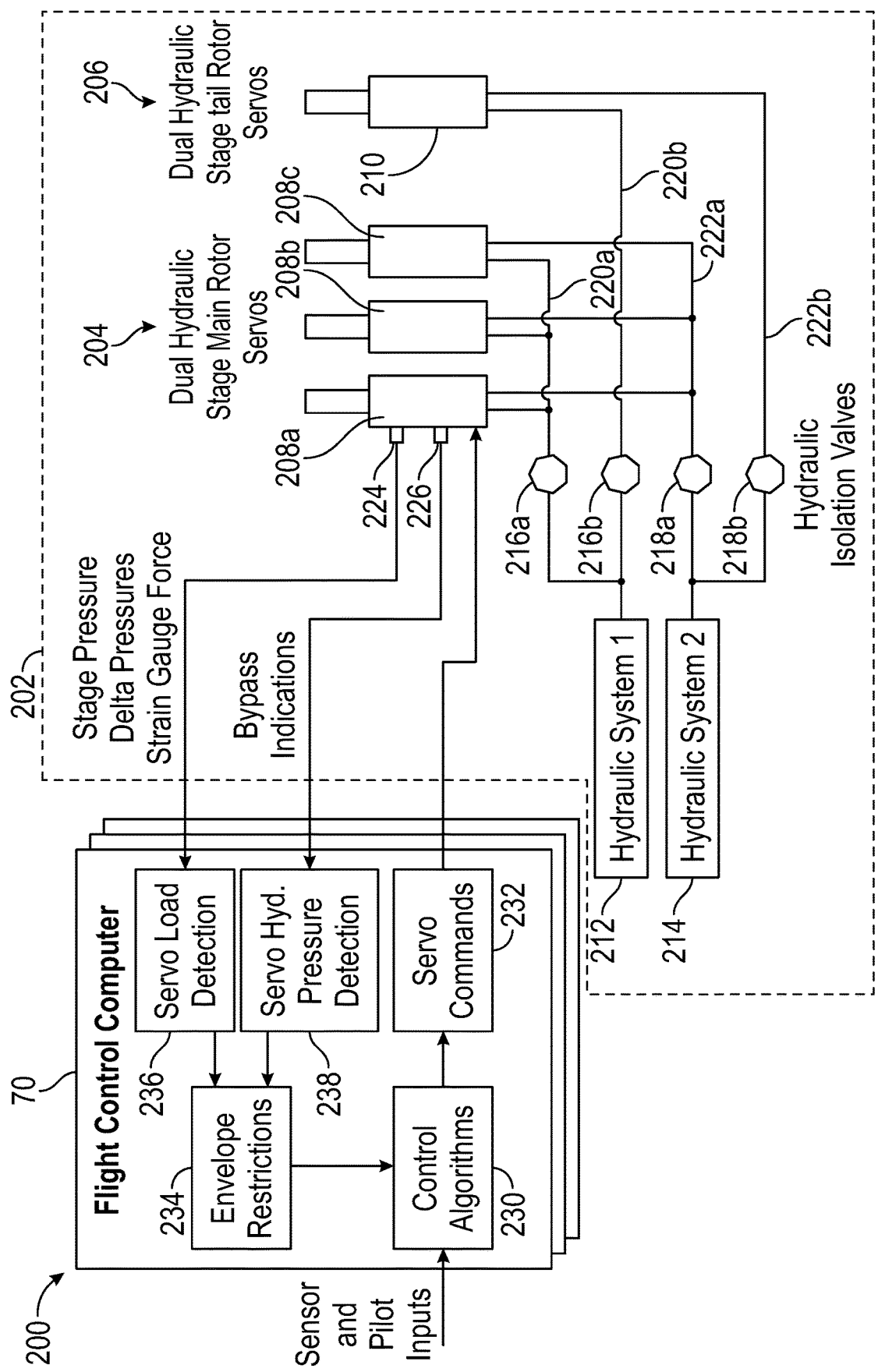
FIG. 2 shows a schematic diagram of a flight system for operating a rotary-wing aircraft such as the exemplary rotary-wing aircraft of FIG. 1.

FIG. 2 shows a schematic diagram of a flight system 200 for operating a rotary-wing aircraft such as the exemplary rotary-wing aircraft 100 of FIG. 1. The flight system 200 includes flight components and hardware 202 that operate to provide flight to the aircraft 100 and a flight control system 70 that controls operation of the flight components and hardware 202. The flight components and hardware 202 include a main rotor system 204, a tail rotor 206 and hydraulic systems 212, 214 that operate the main rotor system 204 and tail rotor system 206 by hydraulic power or hydraulic pressure. The main rotor system 204 includes three main rotor servos 208a, 208b, 208c whose motions are coordinated to provide a rotation at the main rotor system 204. The main rotor servos 208a, 208b, 208c operate on hydraulic power. The tail rotor system 206 includes a single tail rotor servo 210 which operates to provide a rotation at the tail rotor system 206 and which also operates on hydraulic power. In one embodiment, the main rotor servos 208a, 208b, 208b and the tail rotor servos 210 can be dual hydraulic stage servos. It is to be understood that the main rotor system 204 and tail rotor system 206 can also have any number of servo motors powered by any number of hydraulic servo stages in different embodiments.

Two hydraulic systems are used to power the main rotor servos 208a, 208b, 208c and the tail rotor servo 210. A first hydraulic system 212 provides hydraulic power to each of the main rotor servos 208a, 208b, and 208c via a first fluid line 220a. A first valve 216a in the first fluid line 220b controls the flow of fluid from the first hydraulic system 212 to the main rotor servos 208a, 208b, and 208c. The first hydraulic system 212 provides hydraulic power to the tail rotor servo 210 via second fluid line 220b. A second valve 216b in the second fluid line 220b controls flow of fluid from the first hydraulic system 212 to the tail rotor servo 210. In various embodiments, the first valve 216a and second valve 216b are hydraulic isolation valves.

A second hydraulic system 214 provides hydraulic power to each of the main rotor servos 208a, 208b, and 208c and to the tail rotor servo 210. The second hydraulic system 214 provides redundancy to the first hydraulic system 212 so that the aircraft can remain in flight in case of a failure of either the first hydraulic system 212 or the second hydraulic system 214. The second hydraulic system 214 provides fluid to each of the main rotor servos 208a, 208b and 208c via a third fluid line 222a. A third valve 218a in the third fluid line 222a controls the flow of fluid from the second hydraulic system 214 to the main rotor servos 208a, 208b, 208c. The second hydraulic system 214 provides fluid to the tail rotor servo 210 via a fourth flow line 218b. A fourth valve 222b in the fourth flow line 218b controls the flow of fluid from the second hydraulic system 214 to the tail rotor 210.

Sensors 224 and 226 are provided at the servo motors 208a, 208b, 208c and 210 to measure various parameters at the servo motors 208a, 208b, 208c and 210. Sensors 224 and 226 are shown only at servo motor 208a for illustrative purposes only. It is to be understood that additional sensors 224 and 226 can be applied externally to the servo motors 208b, 208c and 210. In various embodiments, sensor 224 measures at least one of a chamber pressure of a servo motor, a pressure difference (delta pressure) in both stages of each servo motor, or a strain on the servo motor. Measurements from this sensor 204 indicate a load on the servo motor. The delta pressure can be used to determine a degree of extension or retraction of a piston in the chamber of a servo motor. The strain measurements can be used to monitor a load on the servo motor 208a. Sensor 224 can be a pressure sensor or a strain gauge, depending on the type of parameter being measured. These measurements can be provided to the flight control system 70 which determines and/or detects the loads on the servomotor. Sensor 226 can measure a hydraulic pressure in a chamber of servo motor 208a. These measurements can be provided to the flight control system 70 which identifies whether the servo motor 208a has full hydraulic pressure or determines which servo motor is experiencing a pressure loss.

The flight control system 70 flies the aircraft 100 according to the pilot's inputs, taking into account the parameter measurements received at the flight control system 70 and the resulting effective flight envelope. In one embodiment, the flight control system 70 receives pilot input and compares the resulting actions requested by the pilot to a flight envelope of the aircraft. When the actions requested by the pilot are outside of the flight envelope, the flight control system 70 provides a different set of command to the flight components and hardware 202 in order to maintain the aircraft 100 within the flight envelope of the aircraft. The flight control system 70 can also determine a flight envelope that is suitable for the aircraft 100 based on the measurements from sensors 224 and 226.

The fight control system 70 includes a control algorithm 230, a servo command module 232 and a flight envelope restrictions module 234. The envelope restrictions module 234 defines and/or calculates one or more flight envelopes of the aircraft 100. The control algorithm 230 receives pilot input and implements control laws to provide a flight command for the aircraft 100 that for producing an action at the aircraft 100 corresponding to the pilot input. The control algorithm 230 compares an action based on the pilot's input to a flight envelope received from the envelope restrictions module 234. When the determined action at the aircraft 100 lies outside of the flight envelope, the control algorithm 230 applies a different set of control laws to the pilot's input to generate flight commands which fly the aircraft 100 within the flight envelope received from the envelope restrictions module 234. The control algorithm 230 provides the flight commands to the servo command module 232. The servo command module 232 generates servo commands for controlling the servo motors and provides the servo commands to the servo motors 208a, 208b, 208c and 210.

The flight control system 70 further includes a servo load detection module 236 and servo hydraulic pressure detection module 238. The servo load detection module 236 receives parameter measurements from sensors 224 and determines a load on the servo motors based on the parameter (e.g., at least one of chamber pressure, delta pressure, strain gauge force measurements). The servo hydraulic pressure detection module 238 receives parameter measurements from sensors 226 and identifies pressure loss at one or more of the servo motor of the main rotor system 204 and/or tail rotor system 206. The load on the servo motors and the hydraulic pressure in the servo motor are provided to the envelope restrictions module 234. The envelope restrictions module 234 identifies impaired servo motors and determines from the load on the servo motors and the hydraulic pressure in the servo motors a change that is to be made to the one or more flight envelopes. The envelope restriction module 234 includes a nominal flight envelope that corresponds to flight of the aircraft at 100% capacity (i.e., with the hydraulic systems and rotor systems able to operate at full capacity). When the envelope restriction module 234 receives a notification of a loss of stage pressure or other hydraulic problem, the envelope restriction module 234 changes the flight envelope to correspond to the capabilities of the impaired flight components and hardware 202 indicated by the measured parameter.

In one embodiment, the envelope restriction module 234 may have stored therein a database of one or more flight envelopes for use under reduced capacity, with each stored flight envelope corresponding to a selected state of the hydraulic power system. For example, the flight envelope can have an assigned range of values for the measured parameters and is therefore selected when the measured parameter is within the assigned range of values. Therefore the envelope restriction module 234 selects the flight envelope from the database based on the measure parameter. It is to be understood that the measured parameter can be a plurality of measured parameters and the stored flight envelopes can be selected based on a range of values for each of the measured parameters.

In another embodiment, the envelope restriction module 234 calculates an effective flight envelope based on the parameter measurements. In one embodiment, the parameter measurements can be used along with the nominal flight envelope of the aircraft in order to calculate the effective flight envelope. The effective flight envelope can be calculated dynamically and can be changed when a condition of the hydraulic power system changes. The envelope restriction module 234 can make calculations on a periodic basis or when triggered by a signal. Therefore, when a condition of the hydraulic systems improves, the flight envelope can be changed to provide more capabilities to the aircraft 100.

Figure 3:
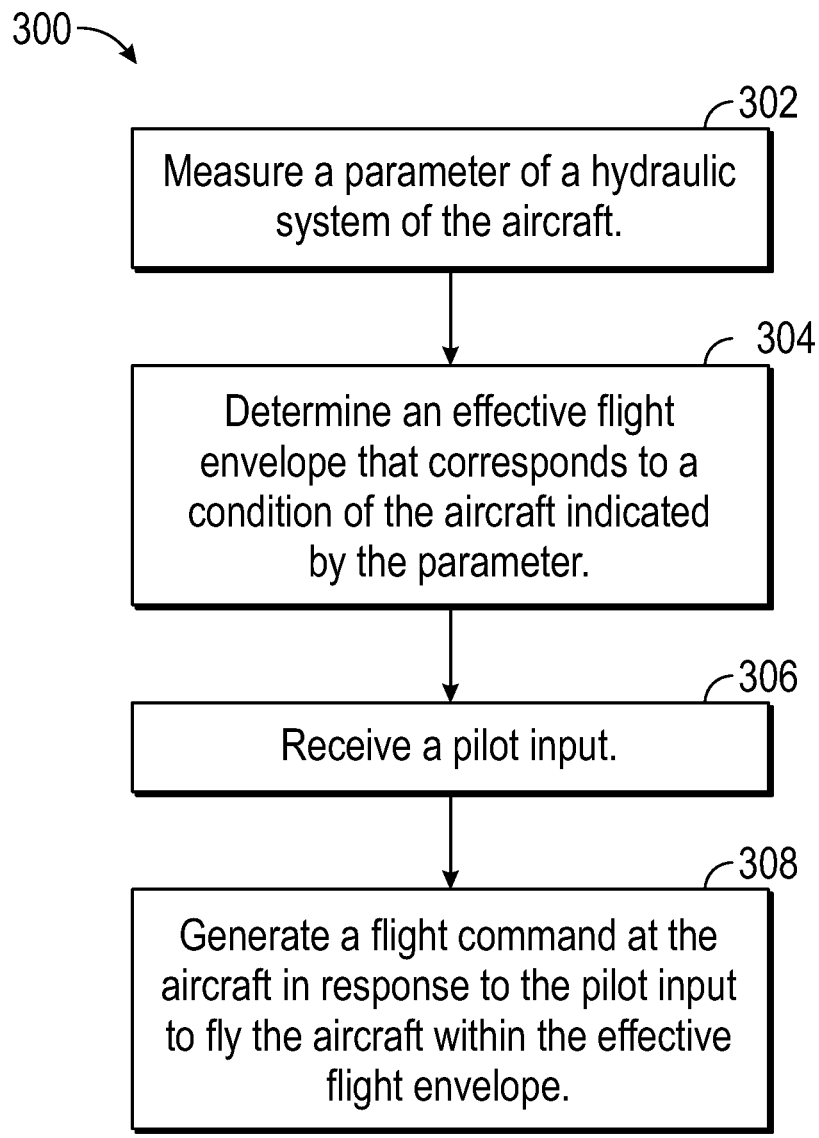
FIG. 3 shows a flowchart illustrating a method of flying an impaired rotary-wing aircraft.

FIG. 3 shows a flowchart 300 illustrating a method of flying a rotary-wing aircraft, as described herein. In box 302, sensors measure an impaired parameter of the hydraulic system. In box 304, the envelope restrictions module determines an effective flight envelope of the aircraft based on a condition of the hydraulic system indicated by the parameter. In box 306, a pilot's input is received at the flight control system 70. For purposes of the invention, the pilot's input requests an action at the aircraft that is outside of the effective flight envelope of the aircraft. In box 308, the control laws generate a flight command in response to the pilot's input to fly the aircraft within the effective flight envelope.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for flying a rotary-wing aircraft, comprising:
   a servo motor for actuating a rotor of the rotary-wing aircraft;
   a hydraulic system for providing hydraulic power to the servo motor;
   a sensor that measures a hydraulic parameter of the hydraulic system;
   a processor configured to:
   determine an impaired condition of the hydraulic system from the hydraulic parameter,
   calculate a flight envelope of the aircraft based on a nominal flight envelope for the hydraulic system operating at full capacity and the impaired condition of the hydraulic system, and
   operate the hydraulic system within the capabilities of the hydraulic system in its impaired condition to fly the aircraft within the flight envelope.

2. The system of claim 1, wherein the hydraulic parameter is a hydraulic pressure in the servo motor and the processor is further configured to calculate the flight envelope based on the hydraulic pressure in the servo motor.

3. The system of claim 1, wherein the processor is further configured to:
   receive a pilot input requesting operation of the aircraft to fly outside of the flight envelope; and
   generate a flight command in response to the pilot input to a flight component and hardware of the aircraft to fly the aircraft so that the aircraft is maintained within the flight envelope.

4. The system of claim 1, wherein the processor is further configured to determine the flight envelope by selecting the flight envelope from a database of flight envelopes.

5. The system of claim 4, wherein the processor is further configured to select the flight envelope from the database based on when a value of the hydraulic parameter is within a range corresponding to the flight envelope.

6. The system of claim 1, wherein the processor is further configured to calculate the flight envelope dynamically based on a value of the hydraulic parameter.

7. The system of claim 2, wherein the sensor further measures a load on the servo motor and the processor is further configured to calculate the flight envelope from the hydraulic pressure in the hydraulic system and the load on the servo motor.

8. A rotary-wing aircraft, comprising:
   a servo system for actuating a rotor of the rotary-wing aircraft;
   a hydraulic system for powering the servo system;
   a sensor that measures a hydraulic parameter of the hydraulic system; and
   a processor configured to:
   determine an impaired condition of the hydraulic system from the hydraulic parameter,
   calculate a flight envelope of the aircraft based on a nominal flight envelope for the hydraulic system operating at full capacity and the impaired condition of the hydraulic system, and
   operate the hydraulic system within the capabilities of the hydraulic system in its impaired condition to fly the aircraft within the flight envelope.

9. The rotary-wing aircraft of claim 8, wherein the hydraulic parameter is a hydraulic pressure in the servo motor and the processor is further configured to calculate the flight envelope based on the hydraulic pressure in the servo motor.

10. The rotary-wing aircraft of claim 8, wherein the processor is further configured to:
    receive a pilot input requesting operation of the aircraft to fly outside of the flight envelope; and
    generate a flight command in response to the pilot input to a flight component and hardware of the aircraft to fly the aircraft so that the aircraft is maintained within the flight envelope.

11. The rotary-wing aircraft of claim 8, wherein the processor is further configured to determine the flight envelope by selecting the flight envelope from a database of flight envelopes when a value of the parameter is within a range assigned to the flight envelope.

12. The rotary-wing aircraft of claim 8, wherein the processor is configured to calculate the flight envelope dynamically based on a value of the hydraulic parameter.

13. The rotary-wing aircraft of claim 9, wherein the sensor further measures a load on the servo motor and the processor is further configured to calculate the flight envelope from the hydraulic pressure in the hydraulic system and the load on the servo motor.

14. The rotary-wing aircraft of claim 8, wherein the flight envelope is dynamically calculated.

15. The system of claim 1, wherein the flight envelope is dynamically calculated.

\* \* \* \* \*